(12) United States Patent
Fink et al.

(10) Patent No.: US 9,111,070 B2
(45) Date of Patent: Aug. 18, 2015

(54) METHOD AND APPARATUS FOR REMOTELY ASSESSING SOFTWARE WITH AUTOMATIC MAINTENANCE OF A SOFTWARE AUDIT FILE

(75) Inventors: Paul Ernest Fink, Mendham, NJ (US); Marc A. Henness, Saylorsburg, PA (US); Walt Szablowski, Newtown, PA (US)

(73) Assignee: Sound View Innovations, LLC, Parsippany, NJ (US)

( * ) Notice: Subject to any disclaimer, the term of this patent is extended or adjusted under 35 U.S.C. 154(b) by 1358 days.

(21) Appl. No.: 10/376,982

(22) Filed: Feb. 28, 2003

(65) Prior Publication Data
US 2003/0140266 A1 Jul. 24, 2003

Related U.S. Application Data

(62) Division of application No. 09/384,117, filed on Aug. 26, 1999, now Pat. No. 6,574,729.

(51) Int. Cl.
*G06F 17/30* (2006.01)
*G06F 21/10* (2013.01)
(Continued)

(52) U.S. Cl.
CPC .............. *G06F 21/105* (2013.01); *H04L 12/24* (2013.01); *H04L 29/06* (2013.01); *H04L 41/00* (2013.01); *Y10S 707/99931* (2013.01)

(58) Field of Classification Search
CPC .......... G06F 17/30982; G06F 17/5054; G06F 9/30021
USPC ............. 707/3, 102, 201, 705, 736, 741, 752, 707/770; 705/2, 11, 59; 709/203, 217, 221; 711/133, 162; 713/1, 176, 200, 201; 714/1; 717/127, 130, 168, 178; 712/230, 244
See application file for complete search history.

(56) References Cited

U.S. PATENT DOCUMENTS

| 4,558,413 | A | 12/1985 | Schmidt et al. |
| 5,155,847 | A | 10/1992 | Kirouac et al. |

(Continued)

OTHER PUBLICATIONS

Reingold et al., Data Structures in Pascal, Little, Brown and Company, Copyright 1986, pp. 89-92.*

(Continued)

*Primary Examiner* — Etienne Leroux
*Assistant Examiner* — Cindy Nguyen
(74) *Attorney, Agent, or Firm* — Lerner, David, Littenberg, Krumholz & Mentlik, LLP

(57) ABSTRACT

A method and apparatus are disclosed for remotely identifying software and software versions using a maintained software audit file. The disclosed system management tool identifies software installed on each network node by comparing the name and size of installed files to a software audit file. The system management tool performs an inventory scan of the software on each network node and obtains a list of each file and the corresponding file size. The software audit file provides identifying information, such as the file name and corresponding size, for each known file. Known files can be quickly identified using a match criteria based, for example, on the file name and size. The software audit file is maintained by investigating any unknown files with a sample of the user population having the unknown file. In one implementation, a targeted query is automatically transmitted to a sample of the user population having the unknown file requesting header information for the unknown file. In this manner, previously unknown files, once identified, can be added to the software audit file. A technique is disclosed for quickly identifying a network node, in order to retrieve a list of instructions to be executed by the network node.

15 Claims, 8 Drawing Sheets

(51) Int. Cl.
*H04L 12/24* (2006.01)
*H04L 29/06* (2006.01)

(56) References Cited

U.S. PATENT DOCUMENTS

| | | | |
|---|---|---|---|
| 5,473,772 | A | 12/1995 | Halliwell et al. |
| 5,619,713 | A * | 4/1997 | Baum et al. ............................ 1/1 |
| 5,696,956 | A * | 12/1997 | Razdan et al. .................. 712/23 |
| 5,752,042 | A | 5/1998 | Cole et al. |
| 5,754,763 | A * | 5/1998 | Bereiter .......................... 726/28 |
| 5,758,071 | A | 5/1998 | Burgess et al. |
| 5,796,633 | A | 8/1998 | Burgess et al. |
| 5,805,897 | A * | 9/1998 | Glowny .......................... 717/178 |
| 5,809,287 | A | 9/1998 | Stupek, Jr. et al. |
| 5,835,911 | A | 11/1998 | Nakagawa et al. |
| 5,848,418 | A | 12/1998 | de Souza et al. |
| 5,852,713 | A | 12/1998 | Shannon |
| 5,999,740 | A | 12/1999 | Rowley |
| 6,073,141 | A | 6/2000 | Salazar |
| 6,175,842 | B1 | 1/2001 | Kirk et al. |
| 6,212,585 | B1 | 4/2001 | Chrabaszcz |
| 6,226,650 | B1 | 5/2001 | Mahajan et al. |
| 6,345,308 | B1 | 2/2002 | Abe |
| 6,425,126 | B1 * | 7/2002 | Branson et al. ............... 717/168 |
| 6,574,729 | B1 * | 6/2003 | Fink et al. ......................... 713/1 |

OTHER PUBLICATIONS

Loosemore et al., The GNU C Library, Oct. 24, 1994, pp. 1-15.*
"Asset Management Software EuroMan 4.0 for Windows" downloaded from www.eurotek co.uk/asselman.htm on Aug 24, 1999.
"Audit+Plus 3.1 Available Now" downloaded from www.computingedge.com/PressReleases/Audit31 and 300Plus.htm, Apr. 9, 1999.
"Audit +Plus" downloaded from www.guisoft.com/au/AuditPlus/, Copyright 1996-1997.
"Audit +Plus, Comprehensive Software Auditing" downloaded from www.computingedge.com/pluspack/index.htm on Aug. 25, 1999.
"Audit +Plus—Check out 300 +Plus Suite for the most comprehensive software asset management for Windows!" downloaded from www.computingedge.com/pluspack/audplus.htm Jun. 18, 1999.
"Government Information Technology Agency (GITA) Asset Management Program (AMP)" downloaded from www.gita.state.az.us/Planning/amp/Asset_Management_Program.htm on Aug. 24, 1999.
"Government Information Technology Agency (CITA) Automated IT Inventory" downloaded from www.gita.state.az.us/ Planning/amp/discbit2.htm on Aug. 24, 1999.
"Methodology Summary" downloaded from www.cti.ca/y2k/Methodology_Summary%281%29.htm on Aug, 24, 1999.
"Tally Systems Helps Save on Taxes With PC Asset Management" downloaded from www.ukbusinessnet.com/ir/editorial/1674.htm on Aug. 24, 1999, (Mar. 3, 1998).
"Tally Systems" PR/UK—What is PC Asset Management downloaded from www.tallysys.com/tally/press/pr/puasset.html (1998).
"Tally Systems' NetCensus Integrates with IT Map 2000 for Y2K" downloaded from www.netinfobuilder.com/tally/y2k/pr012998.htm., Jan. 29, 1998.
"The Source—Invesco To Use Tally Systems' PC Asset Management Software to Beat the Bug" downloaded from www.thesource.dwpub.com/frames/1999/02/2411.html, Feb. 17, 1999.
George Black, "Save Money Through Asset Management" downloaded from www.datamation.com/PlugIn/Issues/1996/april1/04adesk2.html on Aug. 24, 1999.
Matt Hamblen, "Y2K Silver Lining" downloaded from www.computerworld.com/home/news.nsf/CWFlash/9905285desk, May 28, 1999.
Salvator Salarnone "Computer Asset Management, Using Automatic Hardware and Software Systems Can Simplify Administration and Save Money" downloaded from www.byte.com/art/9509/sec6/art1.htm (Sep. 1995).
Systems Management Server 3rd Party Products downloaded from www.technet.microsoft.com/CDONLINE/CONTENT/COMPLETE/BOES/BO/SMS/YPAGES/MGNTPRD.HTM on Aug. 24, 1999.
Tim Wilson, "Network Associates Takes Y2K Software Beyond 2000," Internet Week, downloaded from www.techweb.com/wire/story/y2k/TWB19990128S0011 (Jan. 28, 1999).

* cited by examiner

FIG. 3

MACHINE PACKAGES DATABASE 300

| | MACHINE IDENTIFIER ⌐340 | SOFTWARE FILE IDENTIFIERS ⌐350 |
|---|---|---|
| 305 | | |
| 310 | | |
| 315 | | |
| 320 | | |

FIG. 4

SOFTWARE AUDIT FILE 400

| | SOFTWARE FILE IDENTIFIERS ⌐440 | FILE NAME ⌐450 | FILE SIZE ⌐460 | VERSION ⌐470 | CURRENCY/ COMPLIANCE INFORMATION ⌐480 |
|---|---|---|---|---|---|
| 405 | | | | | |
| 410 | | | | | |
| 415 | | | | | |
| 420 | | | | | |

FIG. 5

UNKNOWN SOFTWARE FILE TABLE 500

| | UNKNOWN FILE ⌐540 | MACHINE IDENTIFIER LIST (SAMPLE POPULATION) ⌐550 | FILE COUNTER (ALL USERS) ⌐560 |
|---|---|---|---|
| 505 | | | |
| 510 | | | |
| 515 | | | |
| 520 | | | |

FIG. 6

MACHINE IDENTIFIER TABLE 600

| MACHINE IDENTIFIER (640) | MACHINE NAME (650) | IP ADDRESS (660) | POINTER TO FIRST INSTRUCTION (670) | POINTER TO LAST INSTRUCTION (680) |
|---|---|---|---|---|
| (605) | | | | |
| (610) | | | | |
| (615) | | | | |
| (620) | | | | |

FIG. 7

MACHINE INSTRUCTION TABLE 700

| MACHINE IDENTIFIER (740) | INSTRUCTION LIST (750) |
|---|---|
| (705) | |
| (710) | |
| (715) | |
| (720) | |

METHOD AND APPARATUS FOR REMOTELY ASSESSING SOFTWARE WITH AUTOMATIC MAINTENANCE OF A SOFTWARE AUDIT FILE

CROSS REFERENCE TO RELATED APPLICATIONS

The present application is a divisional application of U.S. patent application Ser. No. 09/384,117 filed Aug. 8, 1999 now U.S. Pat. No. 6,574,729. The present invention is related to U.S. patent application Ser. No. 09/383,420, entitled "Method and Apparatus for Identifying Computer Hardware Using a Bios Signature," now abandoned, and U.S. patent application Ser. No. 09/384,116, entitled "Method and Apparatus for Obtaining Inventory and User Information for a Remote Computer Device," filed contemporaneously herewith, assigned to the assignee of the present invention and incorporated by reference herein.

FIELD OF THE INVENTION

The present invention relates to a distributed computing system, and more particularly to the remote identification, assessment and management of network elements in a distributed computing system.

BACKGROUND OF THE INVENTION

The resources and computation tasks in a computing system are frequently spread among a plurality of network nodes to form a distributed computing system. When centralized resources are shared by a plurality of users in a distributed system, their costs are distributed over a larger user base. In addition, the centralization of shared resources makes the administration and maintenance of these resources more efficient and also potentially more reliable due to the possibility of a centralized backup mechanism. Furthermore, the redundancy provided by most distributed computing environments improves the ability to recover from a failure by allowing processing tasks to continue on an alternate device upon a detected failure.

While the centralization of shared resources potentially makes the administration and maintenance of network elements more efficient and reliable, the increasing diversity of network elements in distributed computing systems provides additional challenges for network management systems that attempt to manage network resources in a uniform manner. In a large network environment, for example, the task of maintaining an inventory of the connected personal computers and workstations, as well as the software installed on each machine, can be overwhelming.

Thus, a number of automated system management tools are available to remotely inventory computers connected in a network environment. Such system management tools periodically survey each computer and gather hardware and software inventory data by scanning the desktop environment. For example, the System Management Server (SMS)™, commercially available from Microsoft Corporation of Redmond, Wash., inventories the computers connected to a network, and the software installed on each computer. The hardware and software inventories generated by the Microsoft SMS tool can be utilized, for example, to identify computers requiring an upgrade or another reconfiguration.

In addition, the hardware and software inventories generated by such system management tools allow known configuration risks, such as a particular virus or a failure to comply with a particular problem, such as the "Year 2000" or "Euro" problems, to be remotely evaluated and remedied or reduced. In this manner, the compliance of each computer with identified risks can be evaluated to determine whether any further remedial work is required.

While such commercially available system management tools assist with the task of obtaining an inventory of hardware and software in a network environment, they suffer from a number of limitations, which if overcome, could greatly expand the utility of such system management tools. For example, in order to inventory the software installed on connected computers, currently available system management tools analyze header information for each executable file on each computer. Thus, to generate a software inventory, such system management tools must analyze voluminous and duplicated data for many computers. Thus, a need exists for an audit file for identifying software and software versions in an efficient manner. A further need exists for a method and apparatus that automatically and efficiently maintain the software audit file.

SUMMARY OF THE INVENTION

Generally, a method and apparatus are disclosed for remotely identifying software and software versions using a maintained software audit file. The system management tool (SMT) performs an inventory scan of the software on each network node and obtains a list of properties for each file, such as the name and the file size of each file. The disclosed system management tool identifies software installed on each network node by comparing file properties, such as the name and size of installed files, to a software audit file. The software audit file provides identifying information, such as the file name and corresponding size, for each known file to permit quick identification of known files.

According to one aspect of the invention, the software audit file is maintained by investigating any unknown files identified during an inventory scan with a sample of the user population having the unknown file. In one implementation, a targeted query is automatically transmitted to a sample of the user population having the unknown file. The target query requests header information for the unknown file. In this manner, previously unknown files, once identified, can be added to the software audit file.

According to another aspect of the invention, the present invention quickly identifies a network node, in order to retrieve a list of instructions to be executed by the network node. In the illustrative software audit file maintenance embodiment, a targeted query can be quickly retrieved for a member of the sample user population upon the next log-in by the user. In the illustrative embodiment, the targeted query consists of a request to locate the file, obtain requested information about the file and return the requested information to the system management tool. Generally, the present invention permits a fast machine and instruction look-up by storing a machine identifier on each network node, that can be used by the system management tool. The machine identifier can be quickly reduced to a simple index into an array, thereby permitting the system management tool to identify the network node without using a hashing routine. In one implementation, the system management tool server stores a client signature on each network node that includes the machine identifier.

A more complete understanding of the present invention, as well as further features and advantages of the present

BRIEF DESCRIPTION OF THE DRAWINGS

FIG. 3 is a sample table from an exemplary machine packages database of FIG. 2;

FIG. 4 is a sample table from an exemplary software audit file of FIG. 2;

FIG. 5 is a sample table from an exemplary unknown software file table of FIG. 2;

FIG. 6 is a sample table from an exemplary machine identifier table of FIG. 2;

FIG. 7 is a sample table from an exemplary machine instruction table of FIG. 2;

DETAILED DESCRIPTION

Figure 1:
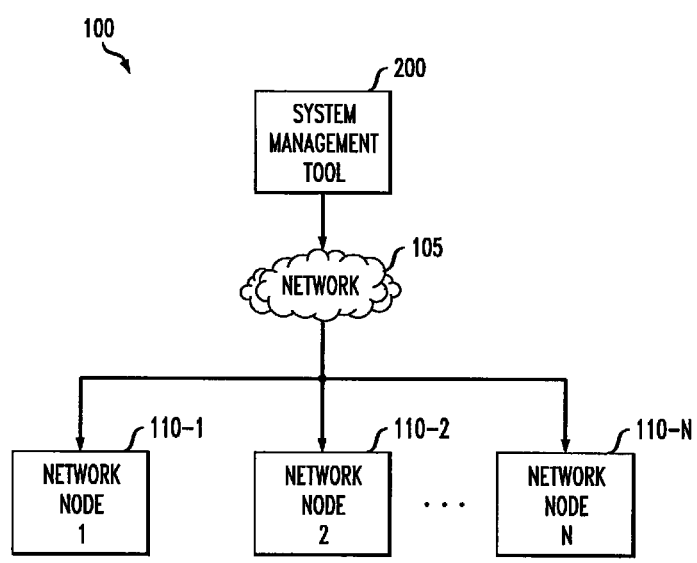
FIG. 1 illustrates a network environment that interconnects a number of network nodes and a system management tool in accordance with the present invention.

FIG. 1 illustrates a network environment 100 that includes a number of network nodes 110-1 through 110-N (hereinafter, collectively referred to as network nodes 110) and a system management tool 200, discussed further below in conjunction with FIG. 2, interconnected by a network 105, such as a local area network (LAN) or a wide area network (WAN). The network nodes 110 may be embodied, for example, as workstations, personal computers, servers or routers.

According to a feature of the present invention, the system management tool server 200 communicates with each network node 110 to identify the software that is installed on each network node 110 using the file name and file size. In one implementation, the system management tool server 200 attempts to identify all files having an ".exe," ".dll" or ".com" extension. While the system management tool server 200 identifies software files in the illustrative embodiment, the present invention can be easily extended to collectively identify a collection of files, such as a software application or a software package, as a single unit. For example, if a version of a word processing application is known to contain a collection of predefined files, the collection of predefined files can be identified as the single word processing application.

The system management tool server 200 performs an inventory scan of the software on each network node 110 and obtains a list of each file and the corresponding file size. The system management tool server 200 also maintains a software audit file 400, discussed below in conjunction with FIG. 4, that provides identifying information, such as the file name and corresponding size, for each known file. Thus, by utilizing a match criteria of file name and size, known files can be quickly identified. If an inventory item does not match the software audit file 400, then the inventory item is added to an unknown audit file for further research.

According to a further feature of the present invention, the audit file is maintained by investigating the unknown file with a sample of the user population having the unknown file. In one implementation, a targeted query is automatically transmitted to a sample of the user population having the unknown file requesting header information for the unknown file. In this manner, previously unknown files can be added to the software audit file 400.

According to another feature of the invention, a mechanism is disclosed for quickly identifying a network node 110, such as a network node 110, in order to retrieve a list of instructions to be executed by the network node 110. In the illustrative software audit file maintenance embodiment, a targeted query can be quickly retrieved for a member of the sample user population upon the next log-in. In the illustrative embodiment, the targeted query consists of a request to locate the file, obtain requested information about the file and return the requested information to the system management tool server 200. Generally, the present invention permits a fast machine and instruction look-up by storing a machine identifier on each network node 110, that can be used by the system management tool server 200. The machine identifier can be quickly reduced to a simple index into an array, thereby permitting the system management tool server 200 to identify the network node 110 without using a hashing routine. In one implementation, the system management tool server 200 stores a client signature on each network node 110 that includes the machine identifier.

Figure 2:
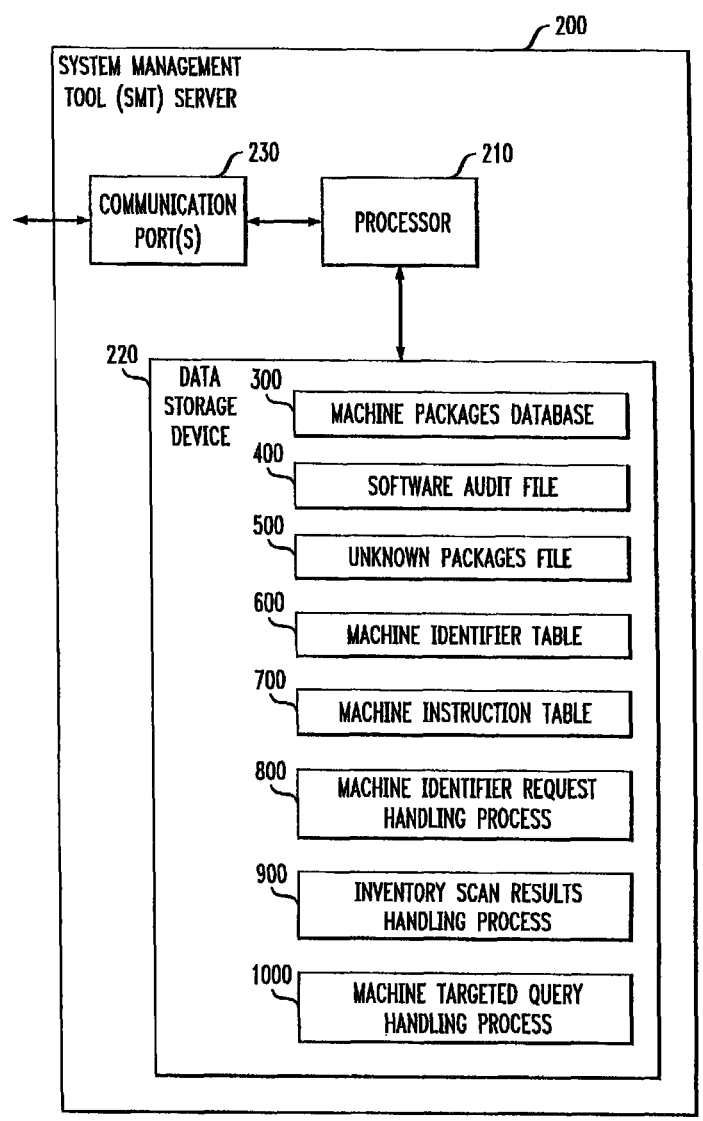
FIG. 2 is a schematic block diagram of an illustrative system management tool server of FIG. 1.

FIG. 2 is a schematic block diagram of an illustrative system management tool server 200. As shown in FIG. 2, the system management tool server 200 includes certain hardware components, such as a processor 210, a data storage device 220, and one or more communications ports 230. The processor 210 can be linked to each of the other listed elements, either by means of a shared data bus, or dedicated connections, as shown in FIG. 2. The communications port(s) 230 allow(s) the system management tool server 200 to communicate with the network nodes 110 over the network 105.

The data storage device 220 is operable to store one or more instructions, discussed further below in conjunction with FIGS. 8 through 10, which the processor 210 is operable to retrieve, interpret and execute in accordance with the present invention. In addition, as discussed further below in conjunction with FIGS. 3 through 7, respectively, the data storage device 220 includes a machine packages database 300, a software audit file 400, an unknown software file table 500, a machine identifier table 600 and a machine instruction table 700. Generally, the machine packages database 300 identifies the software files or packages that are installed on each network node 110. The software audit file 400 maintains a list of identifying information for each known software file or package. The unknown software file table 500 is a list of the software files or packages that are identified during an inventory scan but are not currently found in the software audit file 400. The machine identifier table 600 contains a list of the machine identifiers assigned by the system management tool server 200 and optionally includes additional identifying information for each network node 110, such as a machine name or IP address or both. The machine instruction table 700 contains instructions associated with the targeted queries to identify unknown files for the sample user population.

In addition, the data storage device 220 includes a machine identifier request handling process 800, an inventory scan results handling process 900 and a machine targeted query handling process 1000. Generally, the machine identifier request handling process 800 is executed by the system management tool server 200 to assign machine identifiers to network nodes 110. The inventory scan results handling process 900 processes the list of files generated by a software inventory scan of each network node 110, in a known manner, to identify unknown files for further processing in accordance with the present invention. The machine targeted query handling process 1000 retrieves a list of instructions to be executed by a network node 110, for example, to perform a targeted query for a member of the sample user population upon the next log-in.

It is noted that the system management tool server 200 may load one or more of the databases/tables 300 through 700 into arrays in the memory of the server 200 for faster access. The machine instruction table 700 can be loaded into an array, for example, sorted in a manner to group the instructions for a given network node 110 together. In addition, an instruction index array (not shown) can be established in memory containing an index of the sorted array from the machine instruction table 700 by machine identifier. The instruction index array can be implemented as a three-dimensional array with three columns as follows: machine identifier, index into the sorted array from the machine instruction table 700 of the first instruction for the network node 110, and index into the sorted array from the machine instruction table 700 of the last instruction for the network node 110.

Assigning Machine Identifiers

When a network node 110 connects to the server 200 for the first time, the network node 110 will request that the server 200 generate a machine identifier. In one preferred embodiment, the machine identifier should be easily reducible to a unique small integer for fast identification, yet distinct enough so that if the server reassigns the same small integer to another machine another mechanism exists for distinguishing the two machines. Thus, in one implementation, the machine identifier consists of two parts, with the first part being a small integer that serves an index into a machine instruction table 700, discussed below, and the second part being a 128 bit guaranteed unique identifier (GUID) that can be dynamically generated, for example, by the UuidCreate remote procedure call (RPC) function.

The small integer portion should always remain close to the range of 0 and the total number of network node 110 in a machine identifier table 600, in a similar manner to a leased identifier. If the system management tool server 200 has not run an inventory for a period of time that is greater than the cleaning interval, the lease on the integer portion of the identifier will be lost.

The GUID portion of the machine identifier should remain as a permanent identifier of the network node 110 at least until such a time as it gets lost on the client side by completely wiping it off of all the machines fixed drives. Thus, while the GUID uniquely identifies a client, it is much faster to lookup instructions for the client using a simple integer. Once the cleaning interval has elapsed, if the client machine has not been re-inventoried, it is assumed that the network node 110 has been take out of circulation, and therefor it is not necessary to maintain a list of instructions for it. If by chance it gets re-inventoried after it has lost the assigned lease identifier on the small integer portion of the machine identifier, a new lease identifier will be assigned, but the GUID portion of the machine identifier will remain the same. The advantage is a very quick lookup of instructions for the clients, and a guaranteed unique permanent identifier.

Storage of Client Signatures

The machine identifier received by the network node 110 from the server 200 needs to be stored in a near permanent place on the network node 110. In addition to the machine identifier, the network node 110 may also store additional information, such as machine ownership, machine usage, or a more detailed machine identification, collectively referred to as a client signature. In one implementation, the machine identifier is stored in a client signature in the registry of the network node 110, and as a hidden file on each of the fixed drives of the network node 110 for redundancy. The client signature can also include a "client side identifier" for the network node 110 such as the NIC card address, the serial number, or a BIOS Signature. For a detailed discussion of BIOS signature, see our co-pending application entitled "Method and Apparatus for Identifying Computer Hardware Using a Bios Signature,"Ser. No.09/383,420, incorporated by reference above. During an inventory scan of the network node 110, the SMT client looks for the client signature in the registry, and all of the fixed drives of the network node 110. As discussed below in conjunction with FIG. 11, the SMT client will perform a number of predefined actions, depending on where and how many client signatures are found on the network node 110.

FIG. 3 illustrates an exemplary machine packages database 300 that identifies the software files or packages that are installed on each network node 110. The machine packages database 300 identifies a particular network node 110 using a machine identifier (or serial number), and identifies the software files installed on the network node 110. The machine packages database 300 maintains a plurality of records, such as records 305-320, each corresponding to a different network node 110. For each network node 110 identified by a machine identifier in field 340, the machine packages database 300 indicates the installed software files on the network node 110 in field 350. The software file identifiers used in field 350 can be used to index a software audit file 400, discussed below, to obtain more detailed information about the software file.

FIG. 4 illustrates an exemplary software audit file 400 that maintains a list of identifying information for each known software file or package. The software audit file 400 identifies a particular software file (or collection of files) using a software file identifier, and identifies properties of each corresponding software file. The software audit file 400 maintains a plurality of records, such as records 405-420, each corresponding to a different software file (or package). For each software file (or collection of files) identified by a software file identifier in field 440, the software audit file 400 indicates the name of the file (or software application or software package) and the corresponding size in fields 450 and 460, respectively. As previously indicated, the file name and file size properties are used to identify known software files in the illustrative embodiment. In addition, for each software file (or collection of files), the software audit file 400 provides the version number in field 470, and indicates any desired currency or compliance information in field 480.

FIG. 5 illustrates an exemplary unknown software file table 500 that maintains a list of the software files or packages that are identified during an inventory scan but are not currently found in the software audit file 400. As previously indicated, the present invention flags such unknown files for further processing so that they can be added to the software audit file 400, once identified. In this manner, the present invention maintains the software audit file 400. The unknown software file table 500 identifies a particular unknown software file using information obtained during the inventory scan, such as a file name, and contains a list identifying the network nodes 110 upon which the unknown file is installed. The unknown software file table 500 maintains a plurality of records, such as records 505-520, each corresponding to a different unknown software file. For each unknown software file identified in field 540, the unknown packages file 500 contains a list identifying the network nodes 110 in the sample population upon which the unknown file is installed in field 550. In addition, the unknown packages file 500 contains a counter in field 560 that tracks the total number of network nodes 110 upon which the unknown file is installed in field 550. Thus, the counter in field 560 tracks the extent of the distribution of the unknown file, and unknown files with a higher distribution can be given a higher priority for further investigation.

FIG. 6 illustrates an exemplary machine identifier table 600 that maintains a list of the machine identifiers assigned to network nodes 110 by the system management tool server 200 and optionally includes additional identifying information for each network node 110, such as a machine name or IP address or both. The machine identifier table 600 maintains a plurality of records, such as records 605-620, each corresponding to a different network node 110. For each network node 110 identified by a machine identifier in field 640, the machine identifier table 600 indicates the name of the network node 110 and the IP address of the network node 110 in fields 650 and 660, respectively. In addition, in one implementation, the machine identifier table 600 contains pointers to the first and last targeted instruction in the machine instruction table 700 associated with the network node 110 in fields 670 and 680, respectively. As previously indicated, the pointer may actually point to an instruction array stored in the memory of the system management tool server 200, as opposed to the machine instruction table 700 stored in a database.

FIG. 7 illustrates an exemplary machine instruction table 700 that maintains instructions associated with the targeted queries to identify unknown files for the sample user population. The machine instruction table 700 maintains a plurality of records, such as records 705-720, each corresponding to a different instruction. For each instruction indicated in field 750, the associated network node 110 is indicated in field 740. The machine identifier indicated in field 740 of the machine instruction table 700 should be the integer portion of the server generated machine identifier from the machine identifier table 600. The instruction field 750 can be a text type so that the field can hold instructions that are greater than 255 characters long. In one embodiment, the machine instruction table 700 can be sorted using the machine identifier field 740 such that instructions for the same network node 110 are grouped together.

SMT Server Processes

Figure 8:
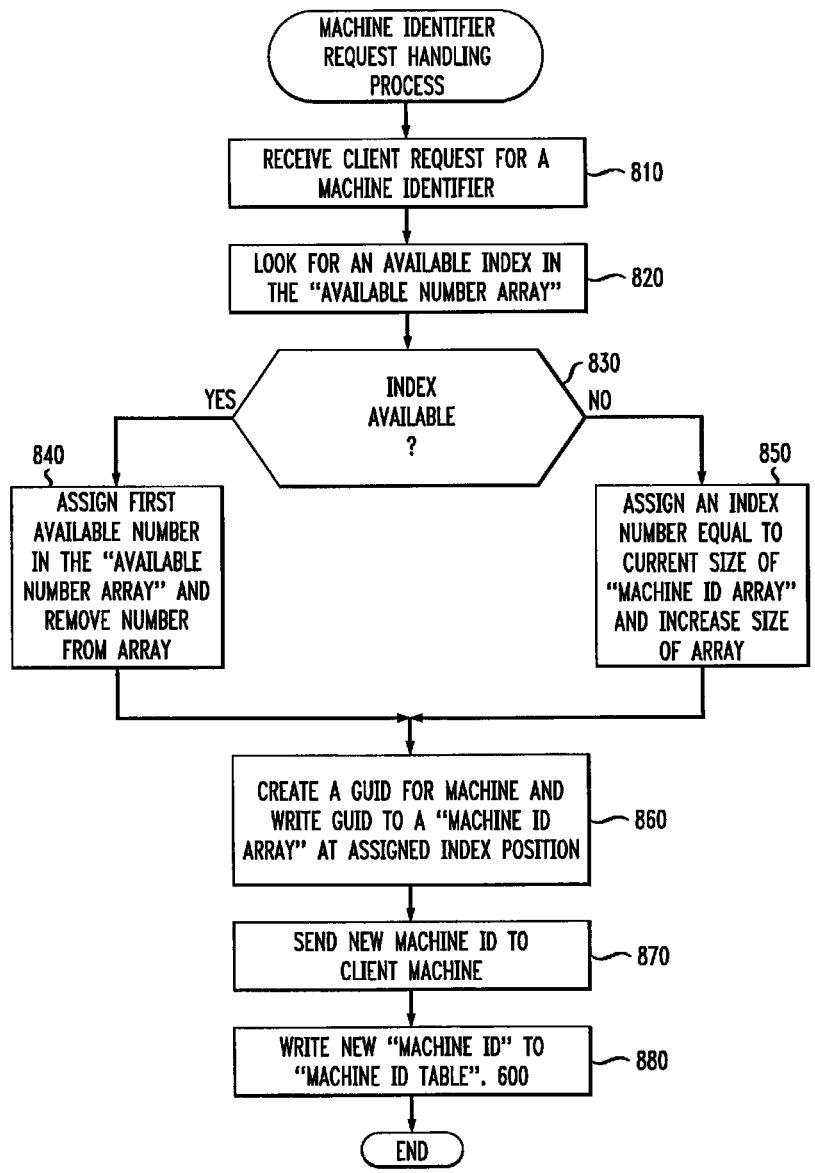
FIG. 8 is a flow chart describing an exemplary machine identifier request handling process executed by the system management tool server of FIG. 2.

As previously indicated, the system management tool server 200 performs a machine identifier request handling process 800, shown in FIG. 8, to assign machine identifiers to network nodes 110. As shown in FIG. 8, the machine identifier request handling process 800 is initiated upon receipt of a request from an SMT client for a machine identifier during step 810. The system management tool server 200 then looks for an available index (machine identifier) in an available number array during step 820.

A test is performed during step 830 to determine if an index is available. If it is determined during step 830 that an index is available then the first available number is assigned to the network node 110 during step 840 and the assigned number is removed from the available number array. If, however, it is determined during step 830 that an index is not available then an index number is assigned during step 850 equal to the current size of the machine identifier array and the size of the machine identifier array is incremented.

A guaranteed unique identifier (GUID) is created for the network node 110 during step 860 and the GUID is written to the machine identifier array at the assigned index position. The system management tool server 200 transmits the machine identifier to the network node 110 during step 870 and writes the machine identifier to the machine identifier table 600 during step 880, before program control terminates.

Figure 9:
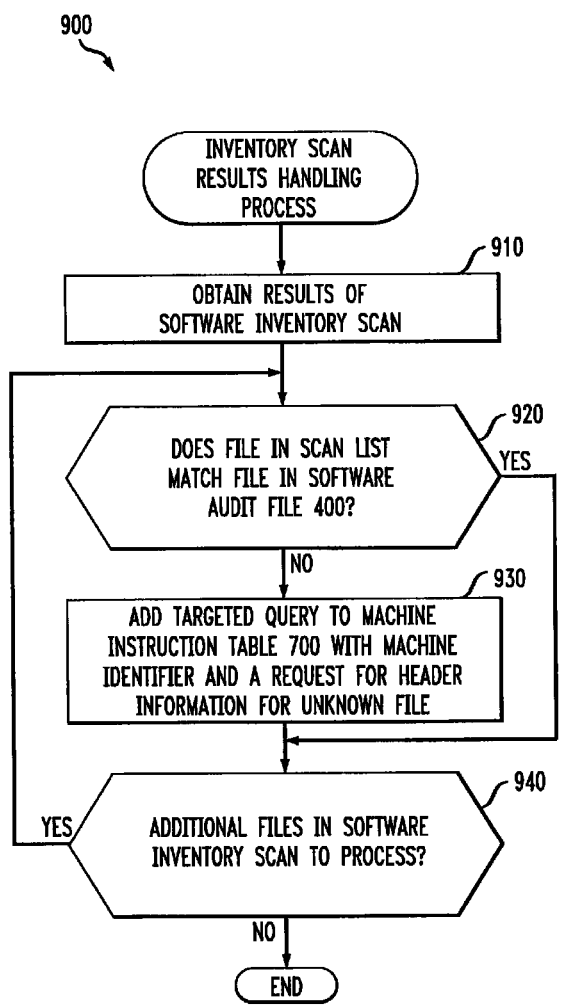
FIG. 9 is a flow chart describing an exemplary inventory scan results handling process executed by the system management tool server of FIG. 2.

As previously indicated, the system management tool server 200 executes an inventory scan results handling process 900, shown in FIG. 9, to process the list of files generated by a software inventory scan of each network node 110, in a known manner, and to identify unknown files for further processing in accordance with the present invention. As shown in FIG. 9, the inventory scan results handling process 900 initially obtains the results of a software inventory scan during step 910, for example, from a commercially available software management tool, such as the System Management Server (SMS)™, commercially available from Microsoft Corporation.

A test is performed during step 920 to determine if a file in the inventory scan list matches the file information in the software audit file 400. If it is determined during step 920 that a file in the inventory scan list matches the file information in the software audit file 400 (for example, based on file name and file size), then the software file being processed has been previously identified and program control proceeds to step 940 to process the next file in the inventory scan list.

If, however, it is determined during step 920 that a file in the inventory scan list does not match the file information in the software audit file 400 (for example, based on file name and file size), then a targeted query is added to the machine instruction table 700 during step 930 containing a machine identifier for the network node 110 where the file was found and a request for header information for the unknown file.

A test is performed during step 940 to determine if additional files in the software inventory scan list must be processed. If it is determined during step 940 that additional files exist, then program control returns to step 920 to process the next file and continues in the manner described above. If, however, it is determined during step 940 that additional files do not exist in the inventory list, then program control terminates. In this manner, the inventory scan results handling process 900 generates an instruction for each unknown file that is found on any network node 110.

Figure 10:
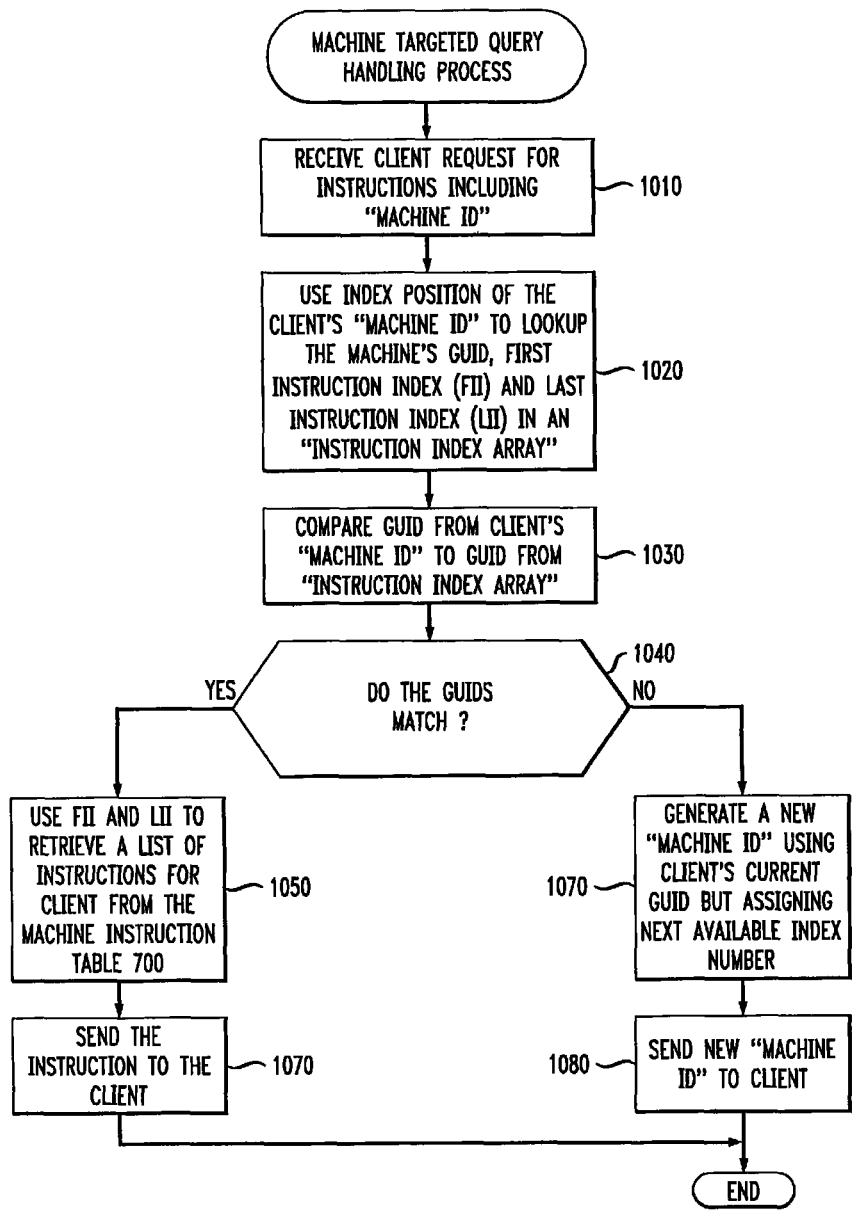
FIG. 10 is a flow chart describing an exemplary machine targeted query handling process executed by the system management tool server of FIG. 2.

As previously indicated, the system management tool server 200 executes a machine targeted query handling process 1000, shown in FIG. 10, to retrieve a list of instructions to be executed by a network node 110, for example, to perform a targeted query for a member of the sample user population upon the next log-in. The machine targeted query handling process 1000 can be executed, for example, upon each log-in by a network node 110 to the system management tool server 200. As shown in FIG. 10, the machine targeted query handling process 1000 initiated during step 1010 upon receiving a request from an SMT client for any instructions to be executed. The request generally includes a machine identifier of the network node 110.

The system management tool server 200 uses the index portion of the machine identifier during step 1020 to look up the GUID of the network node 110, as well as a first instruction index (FII) (from field 670 of the machine identifier table 600) and a last instruction index (LII) (from field 680 of the machine identifier table 600) in the instruction index array. Thereafter, the system management tool server 200 compares the GUID from the machine identifier of the network node 110 during step 1030 to the corresponding GUID from the instruction index array.

A test is performed during step 1040 to determine if the GUIDs match. If it is determined during step 1040 that the GUIDs do match, then the first instruction index (FII) and the last instruction index (LII) are used to retrieve the list of instructions for the network node 110 from the machine instruction table 700 (or a corresponding array loaded into memory). The system management tool server 200 then transmits the instruction list to the network node 110 during step 1060, before program control terminates during step 1090.

If, however, it is determined during step 1040 that the GUIDs do not match, then a new machine identifier is generated during step 1070, using the current GUID of the network node 110, but assigning the next available index number. The new machine identifier is then transmitted to the network node 110 during step 1080 before program control terminates during step 1090.

SMT Client Process

Figure 11:
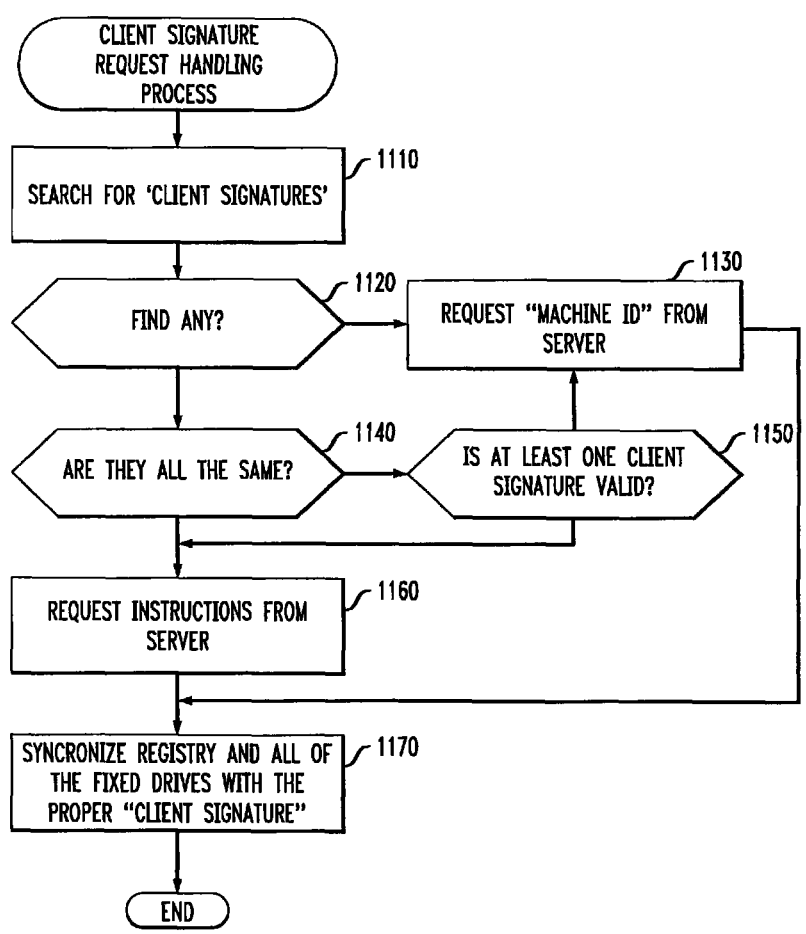
FIG. 11 is a flow chart describing an exemplary client signature request handling process executed by an SMT client on a network node of FIG. 1.

The SMT client executing on a network node 110 executes a client signature request handling process 1100, shown in FIG. 11, to handle requests from the system management tool server 200 for a client signature. As shown in FIG. 11, the client signature request handling process 1100 initially searches for the client signature during step 1110.

A test is performed during step 1120 to determine if any client signatures are identified. If it is determined during step 1120 that client signatures do exist on the network node 110, then a further test is performed during step 1140 to determine if the identified client signatures are all the same. If, however, it is determined during step 1120 that client signatures do not exist on the network node 110, then the SMT client requests a machine identifier from the system management tool server 200 during step 1130 and then program control proceeds to step 1170, discussed below.

If it is determined during step 1140 that the identified client signatures are all the same, then the SMT client uses the machine identifier contained in the client signature to obtain instructions from the server during step 1160. If, however, it is determined during step 1140 that the identified client signatures are not all the same, then a further test is performed during step 1150 to determine if at least one of the client signatures are valid. If it is determined during step 1150 that none of the identified client signatures are valid, then program control proceeds to step 1130 and continues in the manner described above. If, however, it is determined during step 1150 that at least one of the identified client signatures are valid, then program control proceeds to step 1160 and continues in the manner described above.

The SMT client synchronizes the registry and fixed drives with the proper client signature during step 1170, before program control terminates.

It is to be understood that the embodiments and variations shown and described herein are merely illustrative of the principles of this invention and that various modifications may be implemented by those skilled in the art without departing from the scope and spirit of the invention.

We claim:

1. A method for retrieving an instruction set to be executed by a network node in a distributed computing system, comprising the steps of:

assigning a machine identifier to said network node, wherein said machine identifier is reducible to an integer;

maintaining a set of instructions to be executed by said network node, said set of instructions being indexed by said integer;

sorting said instruction set based on said integer to form a sorted instruction set;

maintaining an instruction index array comprised of an entry having said machine identifier and at least one index into said sorted instruction set;

obtaining said machine identifier from said network node; and retrieving said set of instructions using said integer and said instruction index array.

2. The method of claim 1, wherein said machine identifier comprises said integer and a unique identifier.

3. The method of claim 2, wherein said unique identifier allows said network node to be identified if said integer is reassigned to another network node.

4. The method of claim 1, wherein said instruction set contains a targeted query to identify an unknown software file.

5. The method of claim 1, wherein said instruction set includes a request for header information for an unknown file installed on said network node.

6. A system for retrieving an instruction set to be executed by a network node in a distributed computing system, comprising:

a memory for storing computer readable code; and a processor operatively coupled to said memory, said processor configured to:

assign a machine identifier to said network node, wherein said machine identifier is reducible to an integer;

maintain a set of instructions to be executed by said network node, said set of instructions being indexed by said integer;

sort said instruction set based on said integer to form a sorted instruction set;

maintain an instruction index array comprised of an entry having said machine identifier and at least one index into said sorted instruction set;

obtain said machine identifier from said network node; and retrieve said set of instructions using said integer and said instruction index array.

7. The system of claim 6, wherein said machine identifier comprises said integer and a unique identifier.

8. The system of claim 7, wherein said unique identifier allows said network node to be identified if said integer is reassigned to another network node.

9. The system of claim 6, wherein said instruction set contains a targeted query to identify an unknown software file.

10. The system of claim 6, wherein said instruction set includes a request for header information for an unknown file installed on said network node.

11. A system for retrieving an instruction set to be executed by a network node in a distributed computing system, comprising:

means for assigning a machine identifier to said network node, wherein said machine identifier is reducible to an integer;
means for maintaining a set of instructions to be executed by said network node, said set of instructions being indexed by said integer;
means for sorting said instruction set based on said integer to form a sorted instruction set;
means for maintaining an instruction index array comprised of an entry having said machine identifier and at least one index into said sorted instruction set;
means for obtaining said machine identifier from said network node; and
means for retrieving said set of instructions using said integer and said instruction index array.

12. The system of claim 11, wherein said machine identifier comprises said integer and a unique identifier.

13. The system of claim 12, wherein said unique identifier allows said network node to be identified if said integer is reassigned to another network node.

14. The system of claim 11, wherein said instruction set contains a targeted query to identify an unknown software file.

15. The system of claim 11, wherein said instruction set includes a request for header information for an unknown file installed on said network node.

* * * * *